United States Patent
Tang et al.

(10) Patent No.: US 8,947,616 B2
(45) Date of Patent: Feb. 3, 2015

(54) METHOD FOR MANUFACTURING LIQUID CRYSTAL DISPLAY DEVICE AND LIQUID CRYSTAL DISPLAY DEVICE

(75) Inventors: Guofu Tang, Guangdong (CN); Shihhsiang Chen, Guangdong (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 229 days.

(21) Appl. No.: 13/575,299

(22) PCT Filed: Jun. 7, 2012

(86) PCT No.: PCT/CN2012/076548
§ 371 (c)(1),
(2), (4) Date: Jul. 25, 2012

(87) PCT Pub. No.: WO2013/177813
PCT Pub. Date: Dec. 5, 2013

(65) Prior Publication Data
US 2013/0321732 A1    Dec. 5, 2013

(30) Foreign Application Priority Data
Jun. 1, 2012 (CN) .......................... 2012 1 0178872

(51) Int. Cl.
*G02F 1/1333* (2006.01)
(52) U.S. Cl.
USPC .................................. 349/60; 349/58; 349/59
(58) Field of Classification Search
CPC ................................................. G02F 1/133308
USPC ....................................... 349/58–60, 149, 152
See application file for complete search history.

(56) References Cited

U.S. PATENT DOCUMENTS

| | | | |
|---|---|---|---|
| 2003/0184704 A1* | 10/2003 | Akiyama et al. | 349/158 |
| 2004/0046909 A1* | 3/2004 | Sekiguchi | 349/113 |
| 2009/0115942 A1* | 5/2009 | Watanabe | 349/96 |

FOREIGN PATENT DOCUMENTS

| | | |
|---|---|---|
| CN | 1467698 A | 1/2004 |
| CN | 101398545 A | 4/2009 |
| CN | 101504119 A | 8/2009 |

* cited by examiner

*Primary Examiner* — Phu Vu
(74) *Attorney, Agent, or Firm* — Cheng-Ju Chiang

(57) ABSTRACT

The present invention provides a method for manufacturing a liquid crystal display device, which includes (1) providing a backlight module, a liquid crystal display panel, and a front bezel, wherein the liquid crystal display panel includes a TFT substrate, a CF substrate attached to the TFT substrate, and liquid crystal interposed between the substrates, an interval zone being formed between an edge of the TFT substrate and an edge of the CF substrate, flip chip films being mounted at intervals to the interval zone; (2) attaching cushioning tapes to the interval zone of the TFT substrate at locations other than the flip chip films; (3) assembling the liquid crystal display panel to the backlight module; and (4) assembling the front bezel to the liquid crystal display panel in such a way that the front bezel is positioned on the cushioning tapes of the liquid crystal display panel.

9 Claims, 8 Drawing Sheets

METHOD FOR MANUFACTURING LIQUID CRYSTAL DISPLAY DEVICE AND LIQUID CRYSTAL DISPLAY DEVICE

BACKGROUND OF THE INVENTION

1. Field of the Invention

The present invention relates to the field of liquid crystal displaying, and in particular to a method for manufacturing a liquid crystal display device and a liquid crystal display device.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal display panel itself does not emit light, light must be provided by the backlight module in order to normally display images. Thus, the backlight module is one of the key components of an LCD.

Referring to FIG. 1, a commonly known liquid crystal display device comprises: a backlight module 100, a liquid crystal display panel 300 arranged above the backlight module 100, and a front bezel 500 arranged on the liquid crystal display panel. The backlight module 100 comprises: a backplane 102, a backlight source 104 arranged inside the backplane 102, a light guide plate 106 arranged inside the backplane 102, and a mold frame 108 mounted to the backplane 102. The liquid crystal display panel 300 is positioned on the mold frame 108. The liquid crystal display panel 300 comprises a TFT (Thin Film Transistor) substrate 302, a CF (Color Filter) substrate 304 attached to the TFT substrate 302, and liquid crystal (not shown) interposed between the TFT substrate 302 and the CF substrate 304. The front bezel 500 functions to fix the liquid crystal display panel 300 on the backlight module 100. A cushioning tape 530 is attached to the surface of the liquid crystal display panel 300 that opposes the front bezel 500. The cushioning tape 530 often has a thickness that is greater than the gap between the surface of the front bezel 500 that corresponds to the liquid crystal display panel 300 and the surface of the liquid crystal display panel 300 that faces the front bezel 500 so as to, on the one hand, prevent the front bezel 500 from compressing the liquid crystal display panel 300 to cause abnormalities of the TFT substrate 302 and the CF substrate 304 that lead to abnormal rotation of the liquid crystal and also to, on the other hand, fix and thus prevent the liquid crystal display panel 300 from separating from the front bezel 500.

The CF substrate 304 comprises a glass substrate 305 and a polarizer plate 306 that is attached to the surface of the glass substrate 305 that is distant from the TFT substrate 302. The horizontal distance D between an end of the front bezel 500 and an end of the polarizer plate 306 is generally around 0.7-2 mm, while the distance W between the end of the front bezel 500 and an edge of a display zone is generally around 3-4 mm. If the distance D is excessively small, the liquid crystal display panel 300 cannot be effectively positioned and shifting of the attaching position of the cushioning tape 530 may easily result.

Referring to FIG. 2, to make bezel slimming of the liquid crystal display device, the distance W is of a value of around 1 mm, and meanwhile, the distance D must be reduced too to be as small as 0.2 mm. Under this condition, it is no longer able to attach the cushioning tape 530, and as a consequence, it is not able to prevent the liquid crystal display panel 300 from separating from the front bezel 500.

Referring to FIGS. 3 and 4, to prevent the liquid crystal display panel 300 from separating from the front bezel 500, technical persons proposed to arrange cushioning tapes 530 in an interval zone between the TFT substrate 302 and the CF substrate 304. Each cushioning tape 530 comprises a cushion body 535 and an adhesive body 538 mounted to the cushion body 535. The adhesive body 538 is provided on the entirety of the cushion body 535. COF (Chip On Film) flip chip films 700 are mounted to the interval zone and the cushioning tapes 530 are attached on the flip chip films 700. This makes it necessary to peel off the cushioning tapes 530, when re-working of the flip chip films 700 is necessary. However, the cushioning tapes 530 are generally of stronger adhesion to prevent detachment of the cushioning tapes due to insufficiency of adhesion that might result in separation of the liquid crystal display panel 300 from the front bezel 500. This makes peeling off the cushioning tapes 530 may also cause the flip chip films 700 to be simultaneously peeled off, resulting in bright line defects occurring in a liquid crystal display device.

SUMMARY OF THE INVENTION

An object of the present invention is to provide a method for manufacturing a liquid crystal display device, which is easy to operate, is effective in preventing a liquid crystal display panel from separating from a front bezel, and allows easy re-working of chip-on-film.

Another object of the present invention is to provide a liquid crystal display device, which is effective in preventing a liquid crystal display panel from separating from a front frame, and allows easy re-working of chip-on-film.

To achieve the objects, the present invention provides a method for manufacturing a liquid crystal display device, which comprises the following steps:

(1) providing a backlight module, a liquid crystal display panel, and a front bezel, wherein the liquid crystal display panel comprises a TFT substrate, a CF substrate attached to the TFT substrate, and liquid crystal interposed between the TFT substrate and the CF substrate, an interval zone being formed between an edge of the TFT substrate and an edge of the CF substrate, a plurality of flip chip films being mounted at intervals to the interval zone;

(2) attaching cushioning tapes to the interval zone of the TFT substrate at locations other than the plurality of flip chip films;

(3) assembling the liquid crystal display panel to the backlight module; and (4) assembling the front bezel to the liquid crystal display panel in such a way that the front bezel is positioned on the cushioning tapes of the liquid crystal display panel to form the liquid crystal display device.

Each of the cushioning tapes comprises a cushion body and adhesive bodies mounted to the cushion body. The adhesive bodies are arranged at intervals on the cushion body and are attached to the interval zone of the TFT substrate. The flip chip films are respectively set between the adhesive bodies.

The backlight module comprises a backplane, a backlight source arranged inside the backplane, a light guide plate arranged inside the backplane, and a mold frame mounted to the backplane. The liquid crystal display panel is assembled on the mold frame.

The liquid crystal display panel further comprises spacers arranged between the TFT substrate and the CF substrate and an enclosing resin frame arranged between the TFT substrate and the CF substrate and set along edges of the CF substrate.

The liquid crystal display panel further comprises a first polarizer plate that is attached to the surface of the TFT substrate that is distant from the CF substrate and a second polarizer plate that is attached to the surface of the CF substrate that is distant from the TFT substrate.

The TFT substrate comprises a first glass substrate and a first alignment layer formed on the surface of the first glass substrate that is adjacent to the CF substrate and the CF substrate comprises a second glass substrate and a second alignment layer formed on the surface of the second glass substrate that is adjacent to the TFT substrate.

The present invention further provides a liquid crystal display device, which comprises: a backlight module, a liquid crystal display panel, and a front bezel. The liquid crystal display panel comprises a TFT substrate, a CF substrate attached to the TFT substrate, and liquid crystal interposed between the TFT substrate and the CF substrate. An interval zone is formed between an edge of the TFT substrate and an edge of the CF substrate. A plurality of flip chip films is mounted at intervals to the interval zone. Cushioning tapes are attached to the interval zone of the TFT substrate at locations other than the plurality of flip chip films.

Each of the cushioning tapes comprises a cushion body and adhesive bodies mounted to the cushion body. The adhesive bodies are arranged at intervals on the cushion body and are attached to the interval zone of the TFT substrate. The flip chip films are respectively set between the adhesive bodies.

The backlight module comprises a backplane, a backlight source arranged inside the backplane, a light guide plate arranged inside the backplane, and a mold frame mounted to the backplane. The liquid crystal display panel is assembled on the mold frame.

The liquid crystal display panel further comprises spacers arranged between the TFT substrate and the CF substrate, an enclosing resin frame arranged between the TFT substrate and the CF substrate and set along edges of the CF substrate, and a first polarizer plate that is attached to the surface of the TFT substrate that is distant from the CF substrate and a second polarizer plate that is attached to the surface of the CF substrate that is distant from the TFT substrate. The TFT substrate comprises a first glass substrate and a first alignment layer formed on the surface of the first glass substrate that is adjacent to the CF substrate and the CF substrate comprises a second glass substrate and a second alignment layer formed on the surface of the second glass substrate that is adjacent to the TFT substrate.

The efficacy of the present invention is that the present invention provides a method for manufacturing liquid crystal display device and a liquid crystal display device, in which cushioning tapes are mounted to an interval zone between a TFT substrate and a CF substrate in order to effectively prevent the liquid crystal display panel from separating from the front bezel and the cushioning tapes comprise adhesive bodies that are arranged at interval to shift off the sites of the flip chip films so that the abnormal situations of bright line defects of the known techniques that are caused by the flip chip films being peeled off with the cushioning tapes in re-working of the flip chip films. The operation is easy and the cost is low.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
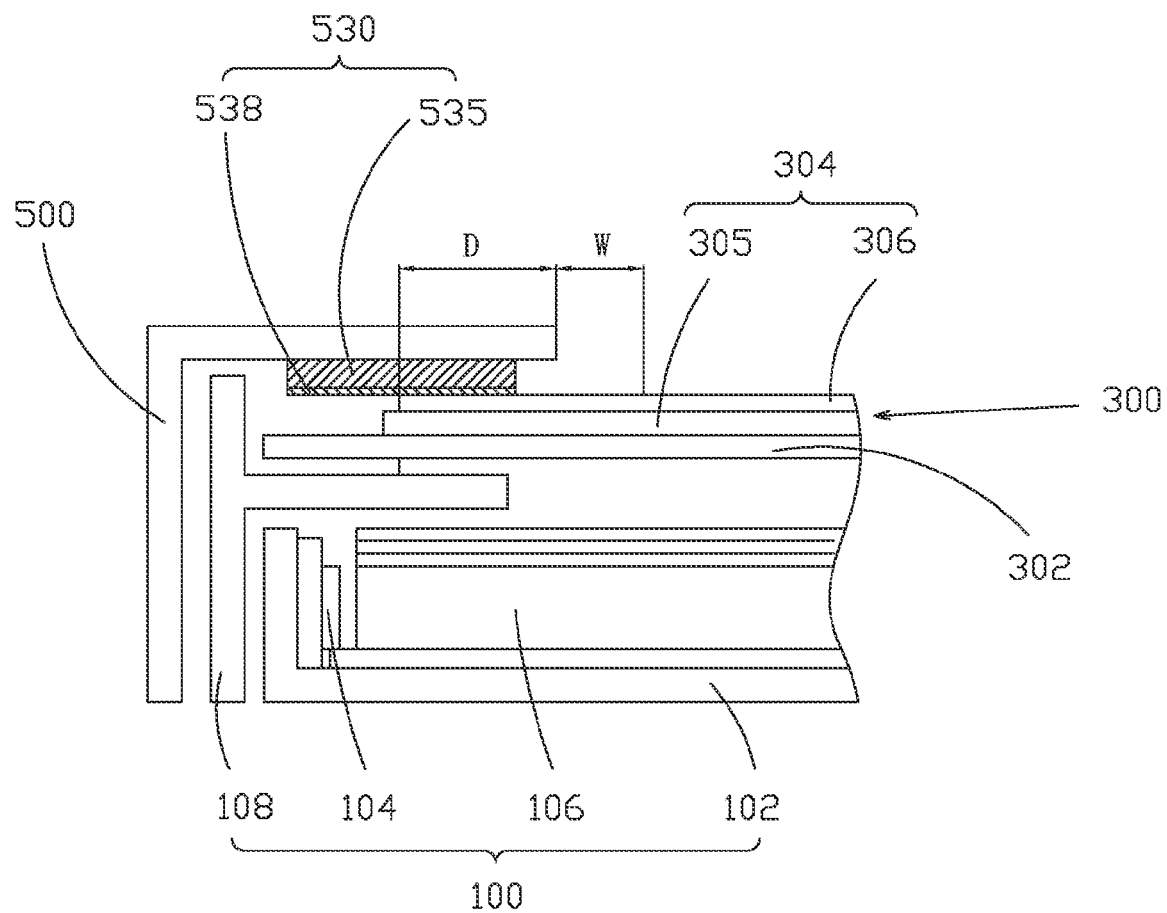
FIG. 1 is a schematic view showing a conventional liquid crystal display device.
Figure 2:
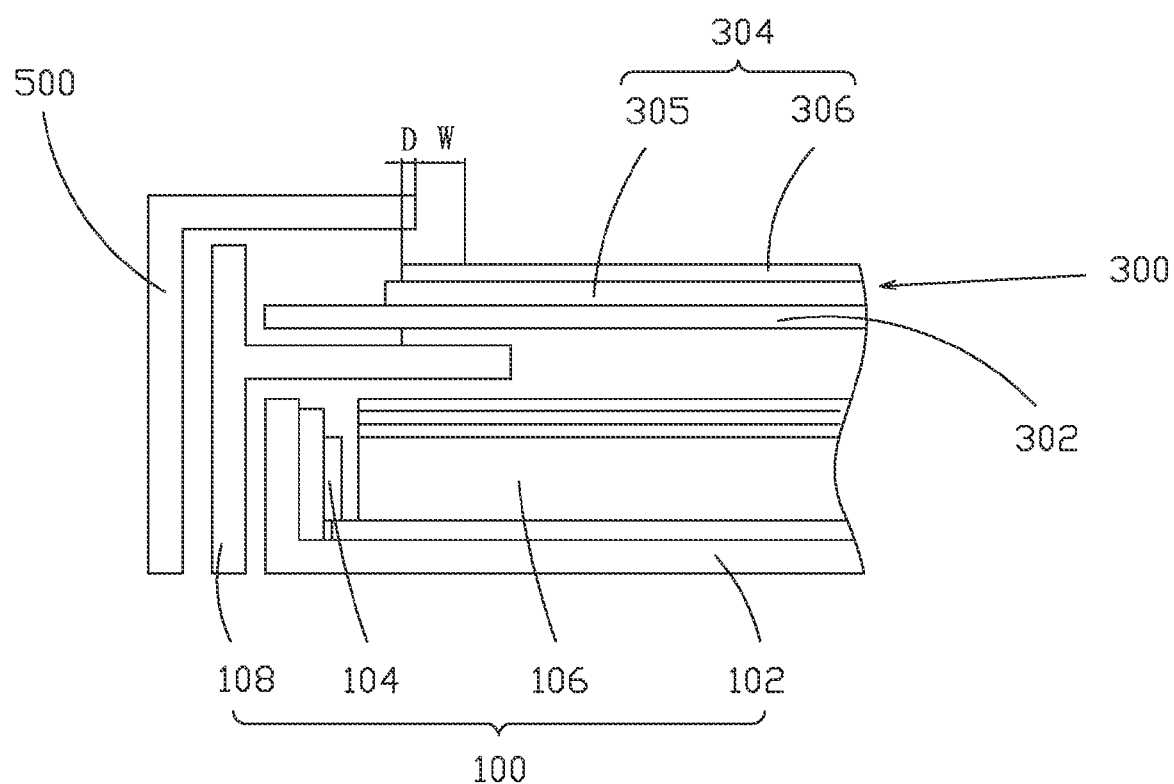
FIG. 2 is a schematic view showing another conventional liquid crystal display device.
Figure 3:
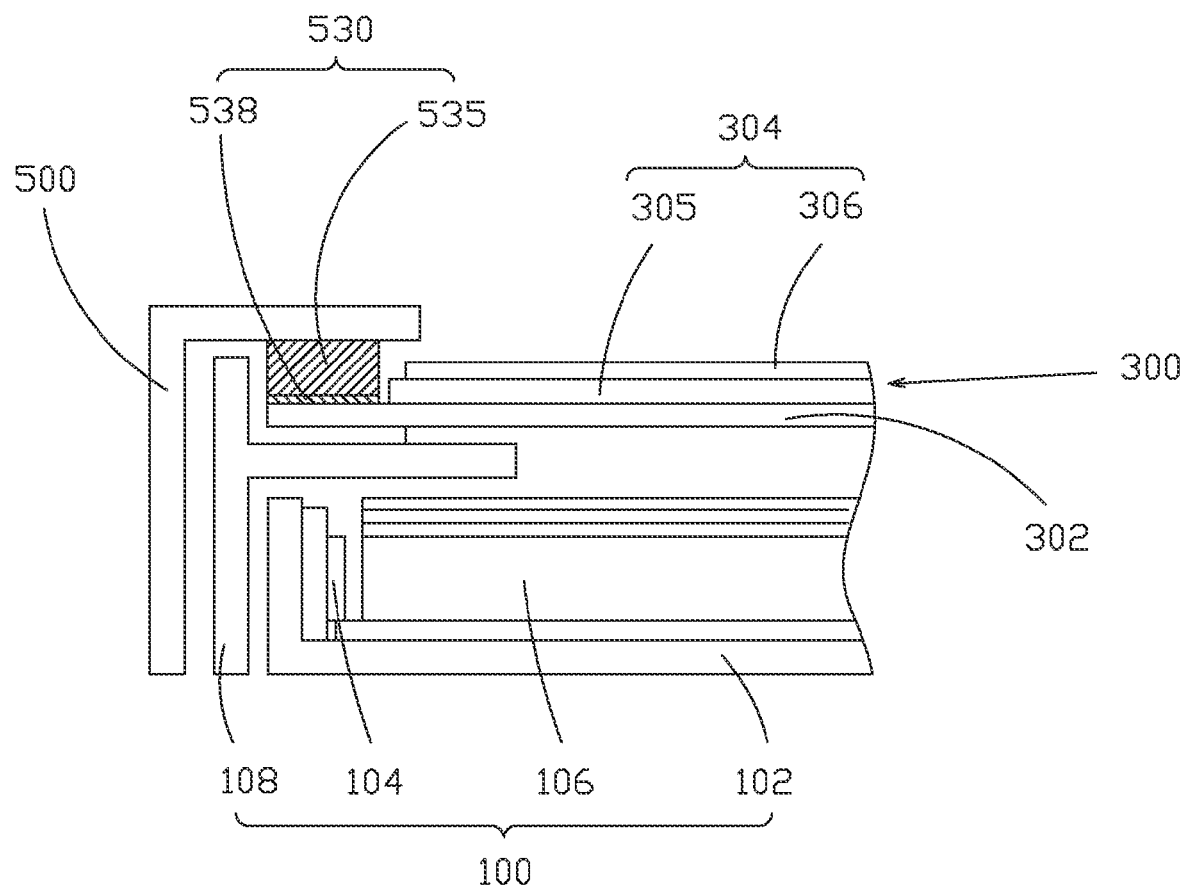
FIG. 3 is a schematic view showing a further conventional liquid crystal display device.
Figure 4:
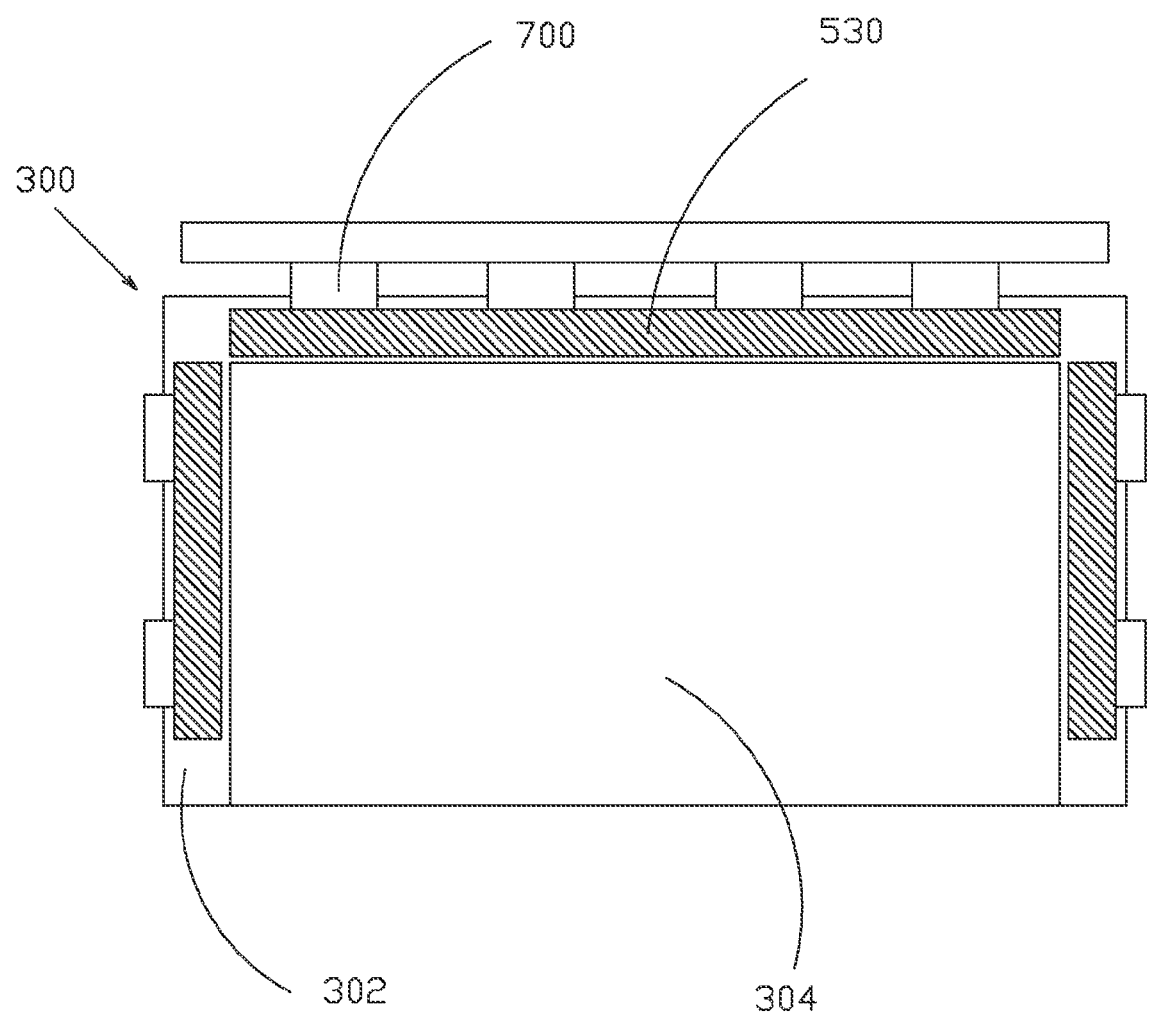
FIG. 4 is a top plan view showing a liquid crystal display panel of FIG. 3.
Figure 5:
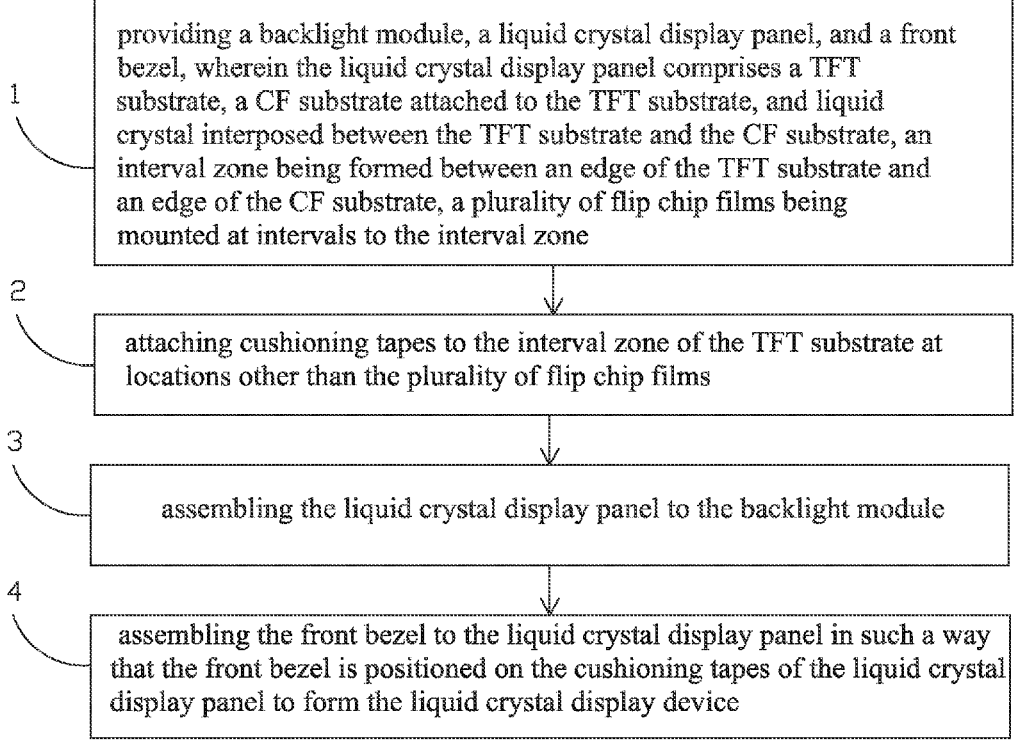
FIG. 5 is a flow chart illustrating a method for manufacturing a liquid crystal display device according to the present invention.
Figure 6:
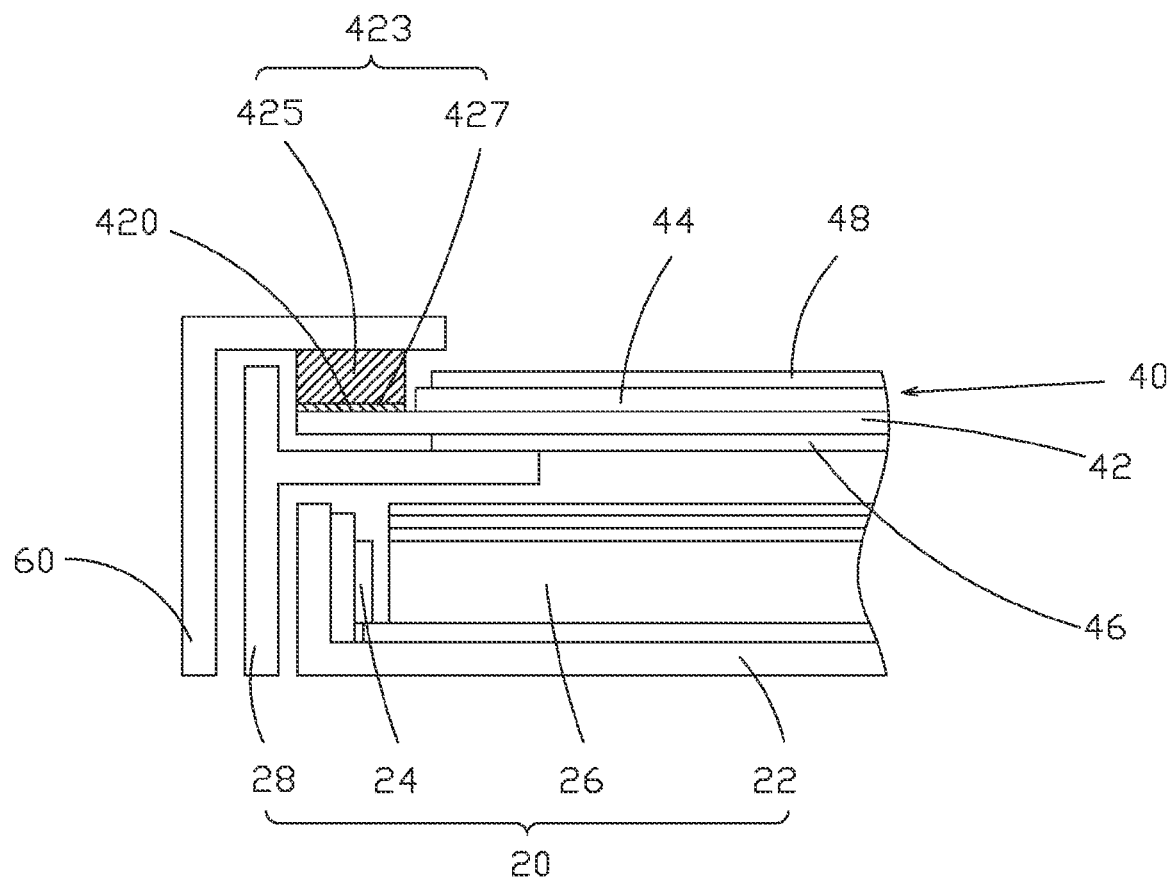
FIG. 6 is a schematic view showing a liquid crystal display device according to an embodiment of the present invention.
Figure 7:
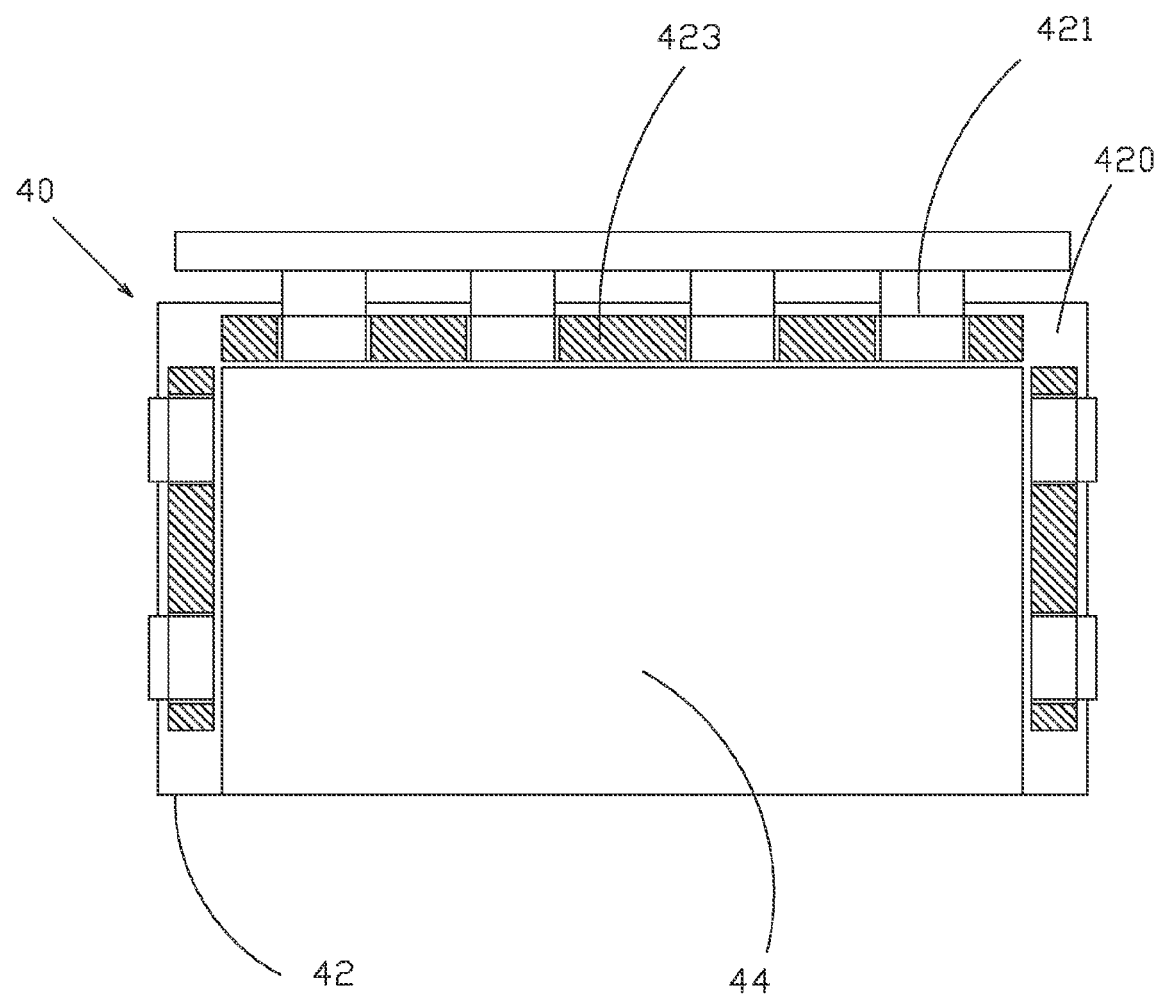
FIG. 7 is a top plan view showing a liquid crystal display panel of FIG. 6.

Referring to FIG. 5, with simultaneous reference to FIGS. 6 and 7, the present invention provides a method for manufacturing a liquid crystal display device, which comprises the following steps:

Step 1: providing a backlight module 20, a liquid crystal display panel 40, and a front bezel 60. The liquid crystal display panel 40 comprises a TFT substrate 42, a CF substrate 44 attached to the TFT substrate 42, and liquid crystal (not shown) interposed between the TFT substrate 42 and the CF substrate 44. An interval zone 420 is formed between an edge of the TFT substrate 42 and an edge of the CF substrate 44. A plurality of flip chip films 421 is mounted at intervals to the interval zone 420. The flip chip films 421 functions to electrically connect the liquid crystal display panel 40 and a power supply (not shown) so as to provide a driving voltage to the liquid crystal display panel 40.

The backlight module 20 comprises a backplane 22, a backlight source 24 arranged inside the backplane 22, a light guide plate 26 arranged inside the backplane 22, and a mold frame 28 mounted to the backplane 22. The liquid crystal display panel 40 is assembled on the mold frame 28.

The liquid crystal display panel 40 further comprises spacers (not shown) arranged between the TFT substrate 42 and the CF substrate 44 and an enclosing resin frame (not shown) arranged between the TFT substrate 42 and the CF substrate 44 and set along edges of the CF substrate 44. The spacers function to support the TFT substrate 42 and the CF substrate 44 to prevent the liquid crystal display panel 40, when depressed, from compressing the liquid crystal and thus causing abnormalities. The enclosing resin frame encloses the liquid crystal between the TFT substrate 42 and the CF substrate 44.

The liquid crystal display panel 40 further comprises a first polarizer plate 46 that is attached to the surface of the TFT substrate 42 that is distant from the CF substrate 44 and a second polarizer plate 48 that is attached to the surface of the CF substrate 44 that is distant from the TFT substrate 42. The first and second polarizer plates 46, 48 function to polarize the light from the backlight module 20.

The TFT substrate 42 comprises a first glass substrate 422 and a first alignment layer (not shown) formed on the surface of the first glass substrate 422 that is adjacent to the CF substrate 44. The CF substrate 44 comprises a second glass substrate 442 and a second alignment layer (not shown) formed on the surface of the second glass substrate 442 that is adjacent to the TFT substrate 42. The first and second alignment layers function to align the molecules of the liquid crystal.

The front bezel 60 is made of a ferrous material and is also referred to as a steel frame, which is used to fix the liquid crystal display panel 40 to the backlight module 20.

Step 2: attaching cushioning tapes 423 to the interval zone 420 of the TFT substrate 42 at locations other than the plurality of flip chip films 421.

In the instant embodiment, each of the cushioning tapes 423 comprises a cushion body 425 and adhesive bodies 427 mounted to the cushion body 425. The adhesive bodies 427 are arranged at interval on the cushion body 425 and are attached to the interval zone 420 of the TFT substrate 42. The flip chip films 421 are respectively set between the adhesive bodies 427. In re-working of the flip chip films 421, the abnormal situations of bright line defects of the known techniques that are caused by simultaneously peeling off the flip chip films at the same time when the cushioning tapes are peeled off can be eliminated.

The cushion bodies 425 are conveyed through reels for application of adhesives, the adhesive bodies 427 are applied to locations where no flip chip film 421 is set.

Step 3: assembling the liquid crystal display panel 40 to the backlight module 20. The mold frame 28 of the backlight module 20 forms a receiving section (not labeled) to correspond to the liquid crystal display panel 40. The liquid crystal display panel 40 is received in the receiving section.

Step 4: assembling the front bezel 60 to the liquid crystal display panel 40 in such a way that the front bezel 60 is positioned on the cushioning tapes 423 of the liquid crystal display panel 40 to form the liquid crystal display device.

Referring to FIGS. 6 and 7, the present invention further provides a liquid crystal display device, which comprises: a backlight module 20, a liquid crystal display panel 40, and a front bezel 60. The liquid crystal display panel 40 comprises a TFT substrate 42, a CF substrate 44 attached to the TFT substrate 42, and liquid crystal (not shown) interposed between the TFT substrate 42 and the CF substrate 44. An interval zone 420 is formed between an edge of the TFT substrate 42 and an edge of the CF substrate 44. A plurality of flip chip films 421 is mounted at intervals to the interval zone 420. Cushioning tapes 423 are attached to the interval zone 420 of the TFT substrate 42 at locations other than the plurality of flip chip films 421. The flip chip films 421 functions to electrically connect the liquid crystal display panel 40 and a power supply (not shown) so as to provide a driving voltage to the liquid crystal display panel 40. The cushioning tapes 423 prevent the liquid crystal display panel 40 from separating from the front bezel 60 and also support the front bezel 60 to prevent direct contact between the front bezel 60 and the liquid crystal display panel 40 that might lead to deformation or break of the liquid crystal display panel 40.

Each of the cushioning tapes 423 comprises a cushion body 425 and adhesive bodies 427 mounted to the cushion body 425. The adhesive bodies 427 are arranged at interval on the cushion body 425 and are attached to the interval zone 420 of the TFT substrate 42. The flip chip films 421 are respectively set between the adhesive bodies 427. In re-working of the flip chip films 421, the abnormal situations of bright line defects of the known techniques that are caused by simultaneously peeling off the flip chip films at the same time when the cushioning tapes are peeled off can be eliminated.

The backlight module 20 comprises a backplane 22, a backlight source 24 arranged inside the backplane 22, a light guide plate 26 arranged inside the backplane 22, and a mold frame 28 mounted to the backplane 22. The liquid crystal display panel 40 is assembled on the mold frame 28.

The liquid crystal display panel 40 further comprises spacers (not shown) arranged between the TFT substrate 42 and the CF substrate 44 and an enclosing resin frame (not shown) arranged between the TFT substrate 42 and the CF substrate 44 and set along edges of the CF substrate 44. The spacers function to support the TFT substrate 42 and the CF substrate 44 to prevent the liquid crystal display panel 40, when depressed, from compressing the liquid crystal and thus causing abnormalities. The enclosing resin frame encloses the liquid crystal between the TFT substrate 42 and the CF substrate 44.

The liquid crystal display panel 40 further comprises a first polarizer plate 46 that is attached to the surface of the TFT substrate 42 that is distant from the CF substrate 44 and a second polarizer plate 48 that is attached to the surface of the CF substrate 44 that is distant from the TFT substrate 42. The first and second polarizer plates 46, 48 function to polarize the light from the backlight module 20.

The TFT substrate 42 comprises a first glass substrate 422 and a first alignment layer (not shown) formed on the surface of the first glass substrate 422 that is adjacent to the CF substrate 44. The CF substrate 44 comprises a second glass substrate 442 and a second alignment layer (not shown) formed on the surface of the second glass substrate 442 that is adjacent to the TFT substrate 42. The first and second alignment layers function to align the molecules of the liquid crystal.

The front bezel 60 is made of a ferrous material and is also referred to as a steel frame, which is used to fix the liquid crystal display panel 40 to the backlight module 20.

Figure 8:
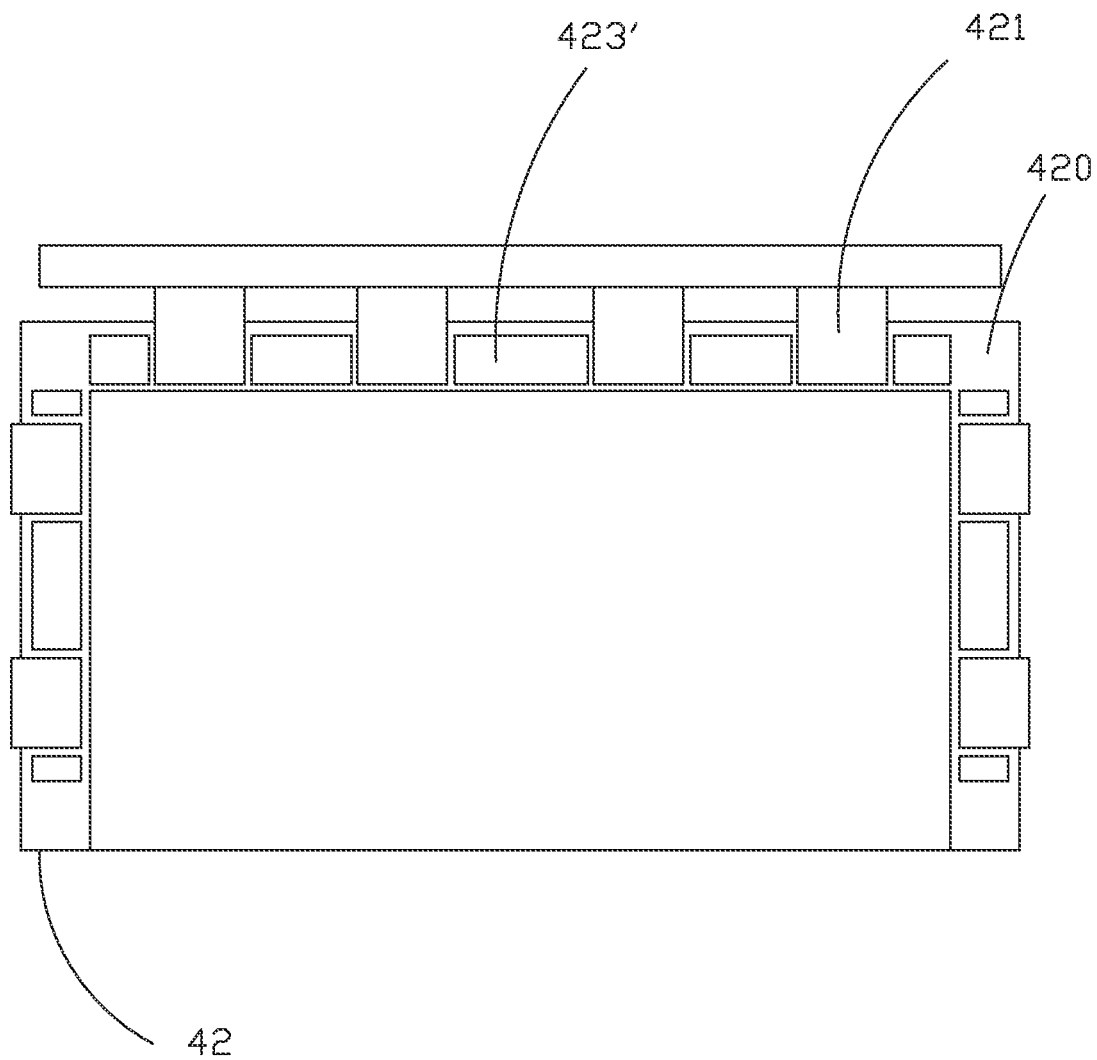
FIG. 8 is a top plan view showing a liquid crystal panel display panel of a liquid crystal display device according to another embodiment of the present invention.

Referring to FIG. 8, which is a top plan view showing a liquid crystal display device according to another embodiment of the present invention, in the instant embodiment, a plurality of cushioning tapes 423' is mounted to the interval zone 420 of the TFT substrate 42 at locations other than the plurality of flip chip films 421. The flip chip films 421 are respectively set between the plurality of cushioning tapes 423'. This equally achieves elimination of the abnormal situations of bright line defects of he known techniques that are caused by simultaneously peeling off the flip chip films at the same time when the cushioning tapes are peeled off in re-working of the flip chip films 421.

In summary, the present invention provides a method for manufacturing liquid crystal display device and a liquid crystal display device, in which cushioning tapes are mounted to an interval zone between a TFT substrate and a CF substrate in order to effectively prevent the liquid crystal display panel from separating from the front bezel and the cushioning tapes comprise adhesive bodies that are arranged at interval to shift off the sites of the flip chip films so that the abnormal situations of bright line defects of the known techniques that are caused by the flip chip films being peeled off with the cushioning tapes in re-working of the flip chip films. The operation is easy and the cost is low.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a liquid crystal display device, comprising the following steps:
   (1) providing a backlight module, a liquid crystal display panel, and a front bezel, wherein the liquid crystal display panel comprises a thin film transistor (TFT) substrate, a color filter (CF) substrate attached to the TFT substrate, and liquid crystal interposed between the TFT substrate and the CF substrate, an interval zone being formed between an edge of the TFT substrate and an edge of the CF substrate, a plurality of flip chip films being mounted at intervals to the interval zone;
   (2) attaching cushioning tapes to the interval zone of the TFT substrate at locations other than the plurality of flip chip films;
   (3) assembling the liquid crystal display panel to the backlight module; and
   (4) assembling the front bezel to the liquid crystal display panel in such a way that the front bezel is positioned on the cushioning tapes of the liquid crystal display panel to form the liquid crystal display device;
   wherein each of the cushioning tapes comprises a cushion body and adhesive bodies mounted to the cushion body, the adhesive bodies being arranged at interval on the cushion body and attached to the interval zone of the TFT substrate, the flip chip films being respectively set between the adhesive bodies.

2. The method for manufacturing a liquid crystal display device as claimed in claim 1, wherein the backlight module comprises a backplane, a backlight source arranged inside the backplane, a light guide plate arranged inside the backplane, and a mold frame mounted to the backplane, the liquid crystal display panel being assembled on the mold frame.

3. The method for manufacturing a liquid crystal display device as claimed in claim 1, wherein the liquid crystal display panel further comprises spacers arranged between the TFT substrate and the CF substrate and an enclosing resin frame arranged between the TFT substrate and the CF substrate and set along edges of the CF substrate.

4. The method for manufacturing a liquid crystal display device as claimed in claim 1, wherein the liquid crystal display panel further comprises a first polarizer plate that is attached to the surface of the TFT substrate that is distant from the CF substrate and a second polarizer plate that is attached to the surface of the CF substrate that is distant from the TFT substrate.

5. The method for manufacturing a liquid crystal display device as claimed in claim 1, wherein the TFT substrate comprises a first glass substrate and a first alignment layer formed on the surface of the first glass substrate that is adjacent to the CF substrate and the CF substrate comprises a second glass substrate and a second alignment layer formed on the surface of the second glass substrate that is adjacent to the TFT substrate.

6. A method for manufacturing a liquid crystal display device, comprising the following steps:
   (1) providing a backlight module, a liquid crystal display panel, and a front bezel, wherein the liquid crystal display panel comprises a thin film transistor (TFT substrate, a color filter (CFl substrate attached to the TFT substrate, and liquid crystal interposed between the TFT substrate and the CF substrate, an interval zone being formed between an edge of the TFT substrate and an edge of the CF substrate, a plurality of flip chip films being mounted at intervals to the interval zone;
   (2) attaching cushioning tapes to the interval zone of the TFT substrate at locations other than the plurality of flip chip films;
   (3) assembling the liquid crystal display panel to the backlight module; and
   (4) assembling the front bezel to the liquid crystal display panel in such a way that the front bezel is positioned on the cushioning tapes of the liquid crystal display panel to form the liquid crystal display device;
   wherein each of the cushioning tapes comprises a cushion body and adhesive bodies mounted to the cushion body, the adhesive bodies being arranged at interval on the cushion body and attached to the interval zone of the TFT substrate, the flip chip films being respectively set between the adhesive bodies;
   wherein the backlight module comprises a backplane, a backlight source arranged inside the backplane, a light guide plate arranged inside the backplane, and a mold frame mounted to the backplane, the liquid crystal display panel being assembled on the mold frame;
   wherein the liquid crystal display panel further comprises spacers arranged between the TFT substrate and the CF substrate and an enclosing resin frame arranged between the TFT substrate and the CF substrate and set along edges of the CF substrate;
   wherein the liquid crystal display panel further comprises a first polarizer plate that is attached to the surface of the TFT substrate that is distant from the CF substrate and a second polarizer plate that is attached to the surface of the CF substrate that is distant from the TFT substrate; and
   wherein the TFT substrate comprises a first glass substrate and a first alignment layer formed on the surface of the first glass substrate that is adjacent to the CF substrate and the CF substrate comprises a second glass substrate and a second alignment layer formed on the surface of the second glass substrate that is adjacent to the TFT substrate.

7. A liquid crystal display device, comprising: a backlight module, a liquid crystal display panel, and a front bezel, the liquid crystal display panel comprising a thin film transistor (TFT) substrate, a color filter (CF) substrate attached to the TFT substrate, and liquid crystal interposed between the TFT substrate and the CF substrate, an interval zone being formed between an edge of the TFT substrate and an edge of the CF substrate, a plurality of flip chip films being mounted at intervals to the interval zone, cushioning tapes being attached to the interval zone of the TFT substrate at locations other than the plurality of flip chip films;
   wherein each of the cushioning tapes comprises a cushion body and adhesive bodies mounted to the cushion body, the adhesive bodies being arranged at interval on the cushion body and attached to the interval zone of the TFT substrate, the flip chip films being respectively set between the adhesive bodies.

8. The liquid crystal display device as claimed in claim 7, wherein the backlight module comprises a backplane, a backlight source arranged inside the backplane, a light guide plate arranged inside the backplane, and a mold frame mounted to the backplane, the liquid crystal display panel being assembled on the mold frame.

9. The liquid crystal display device as claimed in claim 7, wherein the liquid crystal display panel further comprises spacers arranged between the TFT substrate and the CF substrate, an enclosing resin frame arranged between the TFT substrate and the CF substrate and set along edges of the CF substrate, a first polarizer plate that is attached to the surface of the TFT substrate that is distant from the CF substrate and a second polarizer plate that is attached to the surface of the CF substrate that is distant from the TFT substrate, the TFT substrate comprising a first glass substrate and a first alignment layer formed on the surface of the first glass substrate that is adjacent to the CF substrate and the CF substrate comprises a second glass substrate and a second alignment layer formed on the surface of the second glass substrate that is adjacent to the TFT substrate.

* * * * *